United States Patent [19]

Braschel et al.

[11] Patent Number: 4,785,238

[45] Date of Patent: Nov. 15, 1988

[54] SPEED SIGNAL GENERATING CIRCUIT SYSTEM

[75] Inventors: Volker Braschel, Heilbronn; Reiner Emig, Tamm, both of Fed. Rep. of Germany

[73] Assignee: Robert Bosch GmbH, Stuttgart, Fed. Rep. of Germany

[21] Appl. No.: 931,611

[22] Filed: Nov. 17, 1986

[30] Foreign Application Priority Data

Nov. 27, 1985 [DE] Fed. Rep. of Germany ....... 3541853

[51] Int. Cl.[4] .............................................. G01P 3/48
[52] U.S. Cl. .................................... 324/173; 180/197; 361/238
[58] Field of Search ................ 324/173, 174; 180/197; 303/106; 361/238

[56] References Cited

U.S. PATENT DOCUMENTS

| | | | |
|---|---|---|---|
| 4,432,430 | 2/1984 | Lind et al. | 180/197 |
| 4,583,611 | 4/1986 | Frank et al. | 180/197 |

Primary Examiner—A. D. Pellinen
Assistant Examiner—Morris Ginsburg
Attorney, Agent, or Firm—Frishauf, Holtz, Goodman & Woodward

[57] ABSTRACT

To provide an unambiguously representative signal responsive to the speed of a vehicle wheel, an inductive pick-up ($1a$. ... $1n$) is coupled to a suitable star wheel or the like of each one of the wheels, the pick-ups then providing their signals to amplifiers ($3a$. ... $3n$) having hysteresis characteristics. At low speeds, an offset signal is superimposed on the voltage from the inductive pick-ups so that the amplifiers respond and provide output signals only at higher amplitudes of the pick-up signals, thereby eliminating inaccuracies or disturbances occurring in the sensor which might simulate changes in speed of the respective wheel.

4 Claims, 2 Drawing Sheets

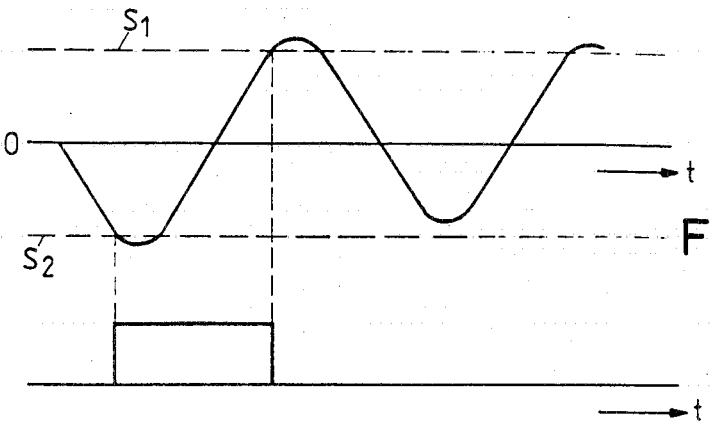
FIG. 2a
FIG. 2b
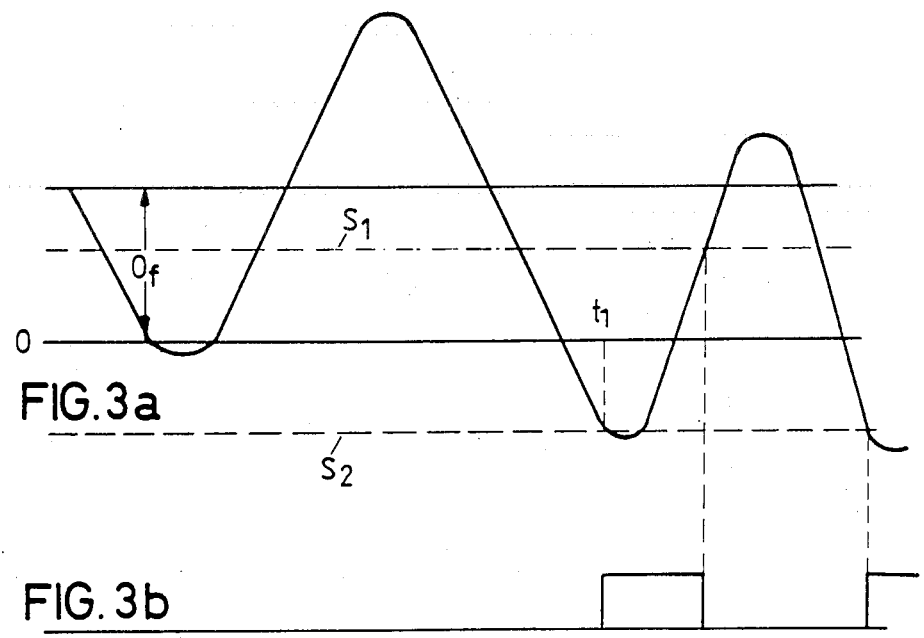
FIG. 3a
FIG. 3b

SPEED SIGNAL GENERATING CIRCUIT SYSTEM

The present invention relates to a signal generating circuit, and more particularly to a circuit in which a speed signal, that is, a signal representative of the speed of rotation of a rotating element, is provided.

BACKGROUND

Various types of speed signal generating circuits are known, and, especially circuits of such type which are coupled to inductive pick-ups and which include signal processing functions to provide square-wave output signals or output pulses in dependence on the received alternating, usually sinusoidal input signals. The signals are passed through an amplifier which, as usually provided, has hysteresis. The hysteresis characteristic is useful to suppress disturbance signals which can appear on connecting lines from the inductive pick-up. Hysteresis, as used herein, is understood to mean that the amplifier provides an output signal when a first predetermined threshold level is exceeded, and continues to provide the output signal until the input signal drops below a second threshold level which is less than the first predetermined threshold level.

The system can be used with anti-brake lock systems, anti-slip regulating systems or the like, and, typically, can be used in connection with many applications in which the rotary element is the wheel of a vehicle, for example and typically an automotive vehicle. When the speed of the wheel is low, the amplitude of the resulting output signal will be small. It may, thus, occur that the first threshold limit of the hysteresis is exceeded only sporadically. An anti-brake lock system (ABS), connected to receive the output signals from the hysteresis-type amplifier, may thus provide erroneous output signals. The input signals to the ABS controller may cease, since the level of the input signal applied to the amplifier is insufficient to exceed the first threshold level. Lack of information representative of wheel speed will cause the controller of the ABS to logically assume that the speed of the wheel has decreased further, and, thus, control a brake to lesser braking value or braking effort. Consequently, a vehicle so equipped will not be braked to its maximum efficient value, since the controller itself, based on electronically erroneous input information, has assumed that a wheel may have been blocked while, actually, it is still rotating.

Various solutions to the problem have been attempted; most of them require a large number of circuit components and sophisticated networks.

THE INVENTION

It is an object to improve a signal generating circuit system, especially adapted for use with an anti-brake lock system, and responsive to wheel speed signals derived from an inductive pick-up, which is simple and reliable and provides output signals which are representative of actual operating conditions of the rotating element, for example a vehicle wheel.

Briefly, the d-c offset signal is added to the alternating voltage derived from the signal pick-up; this modified voltage, that is, the alternating voltage from the pick-up plus the offset signal voltage, is not maintained continuously during generation of the alternating signals. Rather, the addition of the d-c offset signal is terminated when the amplifier—which has hysteresis characteristics—provides a pulse-type output signal.

DRAWINGS

FIG. 1 is a schematic circuit diagram illustrating the system of the present invention; and FIGS. 2a to 3b are wave diagrams, illustrating the operation of the system.

DETAILED DESCRIPTION

Figure 1:
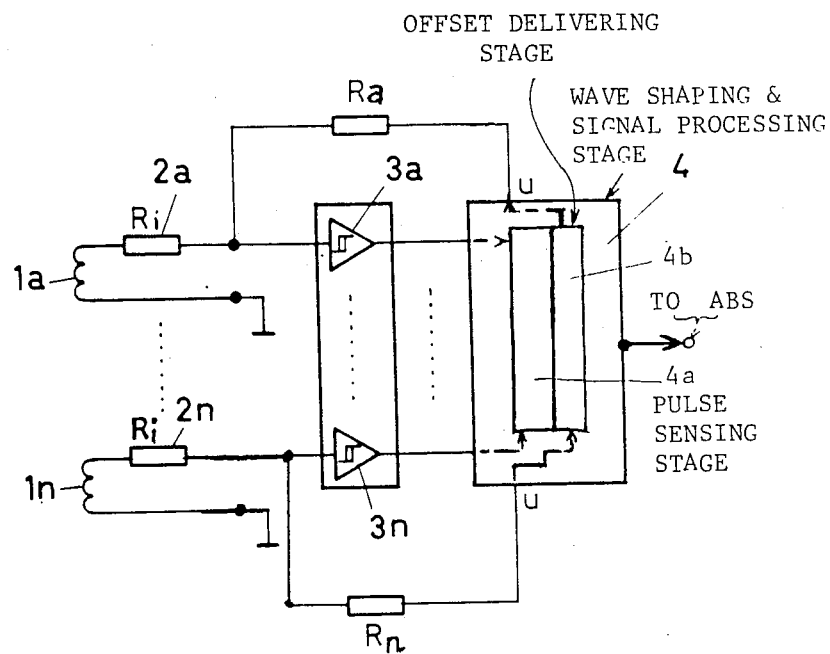

Referring first to FIG. 1: Two stator windings of several stators, having inductive pick-up coils $1a \ldots 1n$, are shown; the internal resistances $R_i$ of the respective inductances $1a \ldots 1n$ are schematically indicated by $2a \ldots 2n$. These inductive pick-ups are coupled, for example, to star wheels or other magnetic members, for example teeth of a gear, which, upon rotation of an associated rotating element, typically the wheel of a vehicle, generate in the respective coils $1a \ldots 1n$ an output voltage, as well known. The output voltages are applied to respective input amplifier sections $3a \ldots 3n$. Each one of the amplifier sections $3a \ldots 3n$ have hysteresis characteristics, that is, the input signal must exceed a first threshold level $S_2$ (FIGS. 2, 3) and terminate the output signal when a second threshold level $S_1$ is passed. The polarities shown in FIGS. 2 and 3 are reversed with respect to "high" and "low" and, in the discussion that follows, the reference to "exceeding" or "dropping below" is to be taken with respect to absolute values, disregarding the sign.

The outputs of the input amplifiers $3a \ldots 3n$ are connected to signal processing circuit 4. Circuit 4 receives square-wave pulse trains, supplied by the amplifiers $3a \ldots 3n$, respectively representative of the speeds of respective wheels having the respectively associated input pick-ups $1a \ldots 1n$. The output signals may, for example, be digital wheel speed signals, suitable for processing in further apparatus, for example an ABS controller.

The signal-processing circuit has an additional function: Circuit 4, in a sensing section 4a, senses if pulsed signals are derived from all amplifiers $3a \ldots 3n$. The sensing section 4a is followed by an offset delivering stage 4b. Normally the offset delivery stage 4b delivers a voltage u to the amplifiers; if the sensing stage 4a determines that all of the outputs from the amplifiers $3a \ldots 3n$ apply square-wave signals to the sensing stage 4a the voltage u vanishes.

The sensing stage so controls the output of the offset delivering stage 4b that during certain periods an offset signal $O_5$ is coupled via resistors $Ra \ldots Rn$ to the inputs of the respective amplifiers $3a \ldots 3n$. This offset signal is a fixed offset signal derived from voltage u, for example, from the circuitry within the signal-processing circuit 4, and indirectly, for example from a vehicle battery.

Operation, with reference to FIGS. 2 and 3:

FIG. 2 illustrates the operation of one amplifier and the circuits of FIG. 1 without offset. The output of any one of the pick-ups $2a \ldots 2n$ is shown with respect to time t. The hysteresis switching thresholds $S_1$ and $S_2$, likewise, are shown. Switching is carried out, first, when the (negative) threshold $S_2$ is exceeded, and terminated when the (positive) threshold $S_1$ is passed. Thus, in a first cycle of the signal as shown in FIG. 2a, the ON threshold $S_2$ is just exceeded; in a second cycle, however, for example due to an unround condition of the rotating element, or due to some other disturbance, the signal does not exceed the first threshold level $S_2$. The output signal, thus, as clearly seen in FIG. 2b, is a single pulse. The failure to provide a second pulse would indicate to a subsequently connected system that the wheel has stopped, which, as can clearly be seen, is not the case.

In accordance with the present invention, a d-c offset voltage shown in FIG. 3a as $O_f$, shifts the zero or crossover line upwardly. The shift, mathematically, is defined by $$O_f = U \cdot (Ri/Ri + R)$$

wherein Ri is the internal resistance of the respective inductance coil $1a \ldots 1n$, and R the resistance value of the respective coupling resistor $Ra \ldots Rn$. A signal corresponding, for example, to the first cycle shown in FIG. 2, or the first cycle of FIG. 3, does not, in FIG. 3, reach the threshold level $S_2$, that is, the amplifier will not provide an output signal. The sensing section senses when an output signal is derived, that is, when the output signal has exceeded the level $S_2$, which occurs at the time t1, and at that time removes or disconnects the offset.

The amplifier, thus, will switch upon subsequent signals.

Preferably, introduction of the offset is commonly carried out for all the channels a ... n and preferably is terminated at a time when the last amplifier provides an output signal. Thus, the sensing section 4a provides an AND-gate characteristic.

It is to be noted that FIGS. 2 and 3 do not illustrate the same conditions. FIG. 2 illustrates that, without offset, and due, for example, to tolerances or other inaccuracies or disturbances, it may occur that the threshold $S_2$ is exceeded only occasionally and a subsequently connected circuit may then react incorrectly with respect to the output. The signal level, of course, can be set by the amplfication factor of the respective amplifiers. The solution to the problem, in accordance with the present invention, is shown in FIG. 3. Due to the offset, it is necessary that the triggering voltage must be substantially higher in order to exceed the threshold $S_2$, namely it must have the value $S_2$+the offset $O_f$. Voltages as shown in FIG. 2, applied to the modified system of FIG. 3 without modification, would not trigger any signal at all. First, a signal as shown at time $t_1$—and measured not from the base line 0, but rather from the offset line $O_f$, must occur in order to exceed the threshold $S_2$. Without offset, the voltage would have substantially exceeded the level $S_2$. At this stage, however, the offset can be removed without danger that the next negative value drops below the level $S_2$, for example due to inaccuracies, unround conditions or the like within the respective or all of the signal transducers in order to provide or trigger a pulse.

By use of the offset, the first crossing of the $S_2$ level will have a higher level ($S_2$+offset $O_f$) applied in order to trigger a pulse.

We claim:

1. Speed signal generating circuit system to obtain a signal representative of speed of a rotating element having
    a stationary inductive pick-up ($1a \ldots 1n$) responsive to induced flux change upon rotation of the rotating element, and generating an alternating voltage;
    an amplifier ($3a \ldots 3n$) connected to receive the alternating voltge, said amplifier having hysteresis characteristics and providing an output pulse signal when the voltage level of the alternating voltage applied thereto exceeds a first predetermined level and terminates the output pulse signal when the voltage level of the alternating voltage applied thereto drops below a second predetermined level,
    said system comprising, means superimposing a d-c signal ($O_f$) over the alternating voltage, and terminating superimposition of the d-c signal when the amplifier ($3a \ldots 3n$) provides the pulse output signal.

2. The system according to claim 1, wherein a plurality of stationary inductive pick-ups ($1a \ldots 1n$) and a plurality of amplifiers ($3a \ldots 3n$) are provided;
    and wherein said means for superimposing the d-c signal and terminating the superimposition includes means for terminating said superimposition of the d-c signal ($O_f$) when all amplifiers provide pulsed output signals.

3. Speed signal generating circuit system to obtain a signal representative of speed of a rotating element having
    a stationary inductive pick-up ($1a \ldots 1n$) responsive to induced flux change upon rotation of the rotating element, and generating an alternating voltage;
    an amplifier ($3a \ldots 3n$) connected to receive the alternating voltage, said amplifier having hysteresis characteristics and providing an output pulse signal when the voltage level of the alternating voltage applied thereto exceeds a first predetermined level and terminates the output pulse signal when the voltage level of the alternating voltage applied thereto drops below a second predetermined level,
    said system comprising,
    means (4b) for adding a d-c signal ($O_f$) to the alternating voltage; and
    means (4a) for sensing if the amplifier delivers a pulse signal, and for terminating addition of said d-c signal ($O_f$) to the alternating voltage when said pulse signal is sensed by said pulse signal sensing means.

4. The system according to claim 3, wherein a plurality of inductive pick-ups ($1a \ldots 1n$) and a plurality of amplifiers ($3a \ldots 3n$) are provided, furnishing a plurality of respective output signals;
    and wherein said means for sensing if the output signals delivered from the amplifier is a pulse signal comprises a stage (4a) sensing if all the amplifiers provide pulsed output signals and for terminating the superimposition or addition of the d-c signal ($O_f$) upon sensing that all amplifiers provide pulsed output signals.

* * * * *